United States Patent [19]
Ikemoto et al.

[11] Patent Number: 5,336,530
[45] Date of Patent: Aug. 9, 1994

[54] PROCESS FOR PRODUCING DECORATIVE MATERIAL

[75] Inventors: Seiji Ikemoto; Katsuhiko Taki; Takashi Matano; Ichiro Kawahata; Kiyoshi Oguchi; Shigeki Ito; Tatsuo Miyauchi, all of Tokyo, Japan

[73] Assignees: Dai Nippon Printing Co., Ltd.; The Inctec, Inc., both of Japan

[21] Appl. No.: 115,097

[22] Filed: Sep. 2, 1993

Related U.S. Application Data

[62] Division of Ser. No. 738,634, Jul. 31, 1991, Pat. No. 5,271,988.

[30] Foreign Application Priority Data

Aug. 3, 1990 [JP] Japan .................. 2-206216

[51] Int. Cl.$^5$ .............................. B05D 5/06
[52] U.S. Cl. ..................... 427/503; 427/259; 427/261; 427/264; 427/265; 427/270; 427/272; 427/282; 427/407.1; 427/498; 427/504; 427/510; 427/512; 427/515; 427/552; 427/558; 427/581
[58] Field of Search ............... 427/488, 491, 498, 504, 427/522, 569, 261, 503, 510, 512, 515, 552, 558, 581, 259, 264, 265, 270, 272, 282, 407.1

[56] References Cited

U.S. PATENT DOCUMENTS

| | | | |
|---|---|---|---|
| 4,654,099 | 3/1987 | Sandman | 156/220 |
| 5,100,770 | 3/1992 | Ashida | 430/523 |

*Primary Examiner*—Bernard Pianalto
*Attorney, Agent, or Firm*—Parkhurst, Wendel & Rossi

[57] ABSTRACT

A coating composition which includes an ionizing radiation-polymerizable oligomer, an ionizing radiation-polymerizable monomer and a releasing agent. The composition has a viscosity regulated to 1000 cps or less, can be rapidly and continuously produced and has excellent surface characteristics. A process for forming a decorative material using the coating composition is also disclosed.

4 Claims, No Drawings

PROCESS FOR PRODUCING DECORATIVE MATERIAL

This is a division of application Ser. No. 07/738,634 filed Jul. 31, 1991, U.S. Pat. No. 5,271,988.

BACKGROUND OF THE INVENTION

The present invention relates to a coating composition. More particularly, the present invention is concerned with an ionizing radiation curing coating composition suitable as a coating composition for use in the interior finishing of buildings and in the surface decoration of furniture and various cabinets, and is also concerned with a decorative material, such as a decorative sheet, formed through the use of the composition.

The conventional decorative paper for use in the interior finishing of buildings and in the surface decoration of furniture and various cabinets is predominantly one produced, for example, by subjecting a paper to moire printing and coating a urethane coating composition on the moire-printed surface so as to form a top coating layer. Such a urethane-coated paper exhibits relatively superior surface characteristics. It, however, often requires several days for the curing of the coating in the manufacturing process to thereby cause manufacturing disadvantages, and the abrasion resistance and the solvent resistance thereof are not always satisfactory.

On the other hand, a method for forming a coating through the use of an ionizing radiation curing resin is also known. For example, a decorative paper can be efficiently produced by printing a pattern on a base paper, coating or impregnating the printed paper with an electron beam curing resin composition of an acrylate resin etc. and irradiating the coated or impregnated paper with an electron beam for curing (see, for example, Japanese Examined Patent Publication (Kokoku) No. 1-55991). However, the conventional ionizing radiation curing coating compositions as mentioned above are not always satisfactory in the properties of the formed coating.

It is generally required that the decorative material for use in the interior finishing of buildings and in the surface decoration of furniture and various cabinets be excellent not only in the abrasion resistance of the coating film surface but also in such characteristics as chemical resistance, cellophane adhesive tape resistance and stain resistance. Further, with respect to the manufacturing process of a decorative material as well, an important factor is that they are advantageous also in simplification of process steps, efficiency and economy.

However, actually, no conventional coating composition for use in a decorative material is excellent in both coating film characteristics and operation facility for a manufacturing process.

SUMMARY OF THE INVENTION

The present invention has been made in view of the above described prior art, and an object of the present invention is to provide a coating composition which can be produced by an efficient, continuous manufacturing process and which gives a coating film excellent in surface characteristics, and to provide a decorative material using the composition.

The coating composition of the present invention is an ionizing radiation curing coating composition comprising a combination of an ionizing radiation-polymerizable oligomer with an ionizing radiation-polymerizable monomer and, added thereto, a surface lubricant, said composition having a viscosity regulated to 1000 cps or less.

Further, the decorative sheet of the present invention is characterized in that it is produced by coating the above-described coating composition on a base material and irradiating the resultant coating with an ionizing radiation to cure the coating.

Still further, the decorative plate of the present invention is characterized by comprising the above-described decorative sheet having a plate bonded through an adhesive layer to the back (side on which no coating composition layer is formed) of the base material of the decorative sheet.

Still further, the process for producing the decorative sheet according to the present invention comprises coating the above-described ionizing radiation curing coating composition preferably in the absence of a solvent to form a composition layer and irradiating the composition layer with an ionizing radiation to cure the composition layer.

In the coating composition of the present invention, the surface lubricant, such as silicone acrylate, is present therein in a dispersed form. Further, the viscosity of the composition is regulated within a predetermined range. These contribute to rapid, desirable formation of a composition layer on a base material and to appropriate localization of the surface lubricant dispersed in optimum conditions on the surface of the composition layer after the coating. As a result, the formed coating has excellent surface characteristics, especially, cellophane adhesive tape resistance.

Moreover, the coating composition of the present invention has a viscosity regulated within a predetermined range and can be coated in the absence of a solvent. Accordingly, a troublesome solvent removal (drying) step can be avoided, and advantages are ensured in operation, safety and economy as well.

DESCRIPTION OF THE PREFERRED EMBODIMENTS

The ionizing radiation-polymerizable oligomer for use in the ionizing radiation curing coating composition of the present invention greatly contributes to an improvement in the physical properties especially hardness, adhesion and electrical properties after curing and chemical resistance. From this viewpoint, an acrylate prepolymer having a molecular weight of from 1000 to 3000 is preferably used. Representative examples of the prepolymer include polyester acrylate, epoxy acrylate, polyurethane acrylate, polyether acrylate, oligoacrylate, alkyd acrylate and polyol acrylate. From the viewpoint of reducing the viscosity and reducing the cost, a polyester acrylate is particularly preferred.

On the other hand, in the choice of an ionizing radiation-polymerizable monomer, consideration must be made in the following respects: (1) low viscosity, (2) high solubility, (3) low volatility, especially the temperature instantaneously rises at the EB curing), (4) presence of at least two functional groups, and (5) high safety such as less skin irritation. From this viewpoint, an acrylate or methacrylate monomer having a molecular weight of from 100 to 400 is preferably used as the ionizing radiation-polymerizable monomer in the present invention. Particularly preferred examples of such monomers include 1,6-hexanediol diacrylate, dipropylene glycol diacrylate, tripropylene glycol diacrylate and trimethylolpropane triacrylate.

The mixing proportions of the above described oligomer and monomer are appropriately chosen according to the types thereof. Generally, however, it is preferred that the mixing proportions of the oligomer and the monomer be chosen so as to be at least 5% by weight and up to 95% by weight, respectively. When a polyester type is employed, it is preferred, for example, that about 70 parts by weight of a monomer be mixed per 100 parts by weight of an oligomer.

When the mixing proportion of the monomer is excessively low, the viscosity is disadvantageously increased to bring about a lowering of leveling, thereby causing the high-speed coating to be unfeasible and causing the productivity to be low. On the other hand, when the mixing proportion of the monomer is excessively high, fuming occurs at the time of curing reaction (for example, at the time of EB irradiation) to suffer from drawbacks, such as filament degradation. This is also unfavorable from the viewpoint of manufacturing environment.

In the coating composition of the present invention, a surface lubricant, such as silicone acrylate, is present in a dispersed state in the above-described combination of an ionizing radiation-polymerizable oligomer with an ionizing radiation-polymerizable monomer.

Generally, it is required that the decorative sheet for use as a building material be excellent in (1) cellophane adhesive tape resistance, (2) solvent resistance, (3) heat resistance, (4) abrasion resistance, (5) chemical resistance, (6) stain resistance, and (7) water resistance. The properties of the above items (2) to (7) can be made satisfactory to a certain extent by choosing appropriate types of oligomer and monomer from those as mentioned above. However, with respect to the cellophane adhesive tape resistance property of the above item (1), satisfactory results cannot be obtained by only choosing appropriate types of oligomer and monomer. In order to improve the cellophane adhesive tape resistance, it is requisite that the surface energy of the coating film surface be minimized to thereby suppress the sticking property of the tape. The present inventors have found that an improvement of the cellophane adhesive tape resistance without detriment to the properties of the above items (2) to (7) can be attained by coating and curing a composition in which a surface lubricant, such as silicon acrylate, is present in a dispersed form, especially in the form of an emulsion dispersion.

Preferably employed as such a silicone acrylate are those satisfying the following conditions:
molecular weight:
from 500 to 10,000, preferably from 2,000 to 4,000,
functional group equivalent (molecular weight/number of functional groups):
from 400 to 8,000, preferably from 500 to 2,000, and
type of functional group:
preferably, a methacryl group, an acryl group and a mercapto group, especially when an EB curing (electron beam irradiation) is contemplated.

In the present invention, the above-described silicone acrylate may be present as it is in the above-described mixture of an oligomer and a monomer. Alternatively, some proportion of the silicone acrylate may form a copolymer with the above-described oligomer or monomer. This aspect is also encompassed by the present invention.

The content of the above-described silicone acrylate is preferably up to 5% by weight, more preferably from 0.1 to 3.0% by weight, and most preferably from 0.5 to 2.0% by weight. As mentioned above, the improvement of cellophane adhesive tape resistance and the improvement of leveling by the addition of the surface lubricant are likely to countervail each other. However, a coating film excellent in both of cellophane adhesive tape resistance and leveling (namely, there is no pin hole) can be obtained by choosing the above-described silicone acrylate as a surface lubricant and regulating the amount thereof within the above-described range.

For the coating composition of the present invention, it is important to regulate the viscosity to 1000 cps or less from the viewpoint of increasing the coating speed, the transferability of the above-described surface lubricant in the composition and the localization of the lubricant onto the surface of the coating film. Also, appropriate regulation of the viscosity within a preferred range is desired in accordance with the coating method employed. For example, when gravure coating is employed, it is preferred to regulate the viscosity to a value much lower than 1000 cps, for example, 400 cps or less at room temperature. Such regulation of the viscosity can be accomplished by heating the coating composition and the coating apparatus for applying the coating composition or by varying the mixing proportion of monomer component as mentioned above.

A matting agent comprised of a particulate material having a particle size of from 0.1 to 30 μm, preferably from 10 to 20 μm, may be added to the coating composition of the present invention for the purpose of providing a matted coating film. Suitable examples of the matting agent include particles of an inorganic material, such as silica and a silicone resin (powder and beads), and powder and beads of an organic material, such as a crosslinked alkyl, a crosslinked styrene, an inzoguanamine resin, a urea-formaldehyde resin, a phenolic resin, polyethylene and a nylon. The matting agent is added in an amount of preferably from 0.5 to 40% by weight, more preferably from 5 to 30% by weight.

Moreover, the coating composition of the present invention may be colored by adding a pigment or a dye in an amount which does not inhibit the curing of the composition.

A solvent may be added to the coating composition of the present invention. The addition of a solvent is not always necessary, and at the time of coating as well, it is not necessary to use a solvent. Accordingly, because the coating composition of the present invention has a viscosity regulated within a predetermined range and can be coated in the absence of a solvent, a troublesome solvent removal (drying) step can be avoided and advantages are ensured in operation, safety and economy.

The method of producing a decorative material by the use of the above-described coating composition will now be described.

Suitably employed as a base material in the manufacturing of a decorative sheet, such as a decorative paper, are paper materials, such as a titanium paper, a tissue paper, a kraft paper, a pulpboard, a paperboard, a gypsum board paper and a synthetic paper, each having a basis weight of about 20 to 300 g/m$^2$, and also, besides paper materials, cloth and various types of coated papers.

The coverage of the coating composition is appropriately chosen in accordance with the property of the base material and the object, which is preferably in the range of from 3 to 60 g/m².

The curing is performed by means of an ionizing radiation, such as ultraviolet rays and electron beams. When the curing is performed by means of electron beams, the EB intensity is desirably in the range of from 2 to 15 Mrad, especially from 3 to 5 Mrad. When the intensity is less than 2 Mrad, poor curing unfavorably occurs due to the dose shortage. On the other hand, when the irradiation is performed at an intensity exceeding 15 Mrad, degradation of the base material is unfavorably caused by the excess dose, which is causative of base material breakage and rupture (for example, at the time of winding or further lamination to a plate).

In particular, when use is made of a base sheet, such as paper, into which the coating composition easily permeates, electron beams are preferred among ionizing radiations. In the case of ultraviolet rays, permeation of the composition into the base material is difficult and the curing of the coating composition is insufficient in the base material. Further, in the case where a pigment or the like is added to the coating composition, ultraviolet rays are likely to be absorbed by the pigment or the like to thereby cause the curing to be insufficient. Accordingly, in such cases, the use of electron beams is preferred.

Efficient, continuous production of a decorative sheet is feasible by the employment of the above-described coating and curing methods.

When the curing is performed by the irradiation of ultraviolet rays, it is preferred to add a photoinitiator and/or a sensitizer to the coating composition. The photoinitiator absorbs ultraviolet rays and initiates a polymerization reaction. Conventional carbonyl compounds, sulfur compounds, azo compounds and organic peroxides may be used as the photoinitiator. The sensitizer may be used in combination with the photoinitiator for attaining improved effects. Conventional amines, sulfur compounds, nitriles, phosphorus compounds, chlorine compounds and nitrogen compounds may be used as the sensitizer.

In the decorative material of the present invention, a print layer and a pattern layer may be previously formed on the surface of the base material, and also a filling layer may be formed thereon.

A resin exhibiting a good adhesion to the base material and having a strong cohesive strength should be chosen as a vehicle of an ink for use in the formation of a pattern layer. The reason is presumed to be that as the ionizing radiation curing coating composition of the present invention suffers from rapid shrinkage at the time of curing, if an ink having poor adhesion to the base material is used, microscopically partial peeling occurs between the ink and the base material due to the shearing stress generated at the interface of the ink and the base material by the curing shrinkage to thereby cause the cellophane adhesive tape resistance of the coating film to be markedly lowered.

Preferably employed as a vehicle when paper is used as a base material are a water soluble salt of acryl, a urethane and a mixture of a urethane and a copolymer of vinyl chloride and vinyl acetate.

It has been found that a fibrous vehicle, such as cellulose nitrate, provides no satisfactory cellophane adhesive tape resistance.

Further, depending upon the purpose, the above-described decorative sheet is integrally bonded to the surface of a member to be decorated, for example, a wood product through an adhesive.

The process for producing a decorative sheet having uneven portions formed in synchronism with the pattern through the use of the composition of the present invention will now be described.

In preparing a decorative sheet having synchronized uneven portions, a liquid repellent pattern layer is first formed on a base sheet, the above described coating composition of the present invention is coated on the pattern layer, a recessed portion is formed in the coating layer formed on the surface of the above-described pattern layer through liquid repellent action between the formed liquid repellent pattern layer and the coating layer. The formed coating layer is irradiated with an ionizing radiation to cure the coating layer having uneven portions in synchronism with the above-described pattern layer, thereby preparing a decorative sheet having uneven portions formed in synchronism with the pattern.

In order to form the above described liquid repellent pattern layer, it is possible to use the conventional printing techniques, such as gravure printing and silk screen printing. The following inks may be used as the liquid repellent ink.

(1) A liquid repellent ink comprising a binder having in itself a liquid repellency and, added thereto, a pigment, dye, etc.

Examples of the binder resin used in this case include fluororesins, such as polyvinylidene fluoride and polyvinyl fluoride, and silicone resins, such as polysiloxane and silicone acrylate. In particular, use are made of binder resins satisfying the following requirement:

critical surface tension of binder < surface tension of coating composition (in liquid state)

(2) An ink comprising a binder not having in itself a liquid repellency and, added thereto, a liquid repellent substance and further a pigment, dye, etc.

Examples of the liquid repellent substance usable in this case include resins, such as silicone resins, fluororesins, substances described in the above item (1), polyethylene and polypropylene, and waxes. Further, in this case, aminoalkyd resins etc. may be used as the binder.

(3) An ink comprising a binder having in itself a liquid repellency and, added thereto, a liquid repellent additive and further a pigment, etc.

EXAMPLE 1

An electron beam curing coating composition comprising the following components was prepared.

polyester acrylate (manufactured by Morohoshi Ink Co., Ltd., Japan) 60 parts by weight trimethylolpropane triacrylate (manufactured by Toagosei Chemical Industry Co., Ltd., Japan) 10 parts by weight 1,6-hexanedioldiacrylate (manufactured by Nippon Kayaku Co., Ltd., Japan) 29 parts by weight silicon acrylate (MEB-1 manufactured by The Shin-Etsu Chemical Co., Ltd., Japan) 1 part by weight Separately, a moire pattern was printed on a reinforced paper (30 g/m²; a product of Sanko Paper Manufacturing Corp., Japan) as a base material by means of a rotogravure printing machine through the use of an acrylic ink (HAT manufactured by Morohoshi Ink Co., Ltd.).

Thereafter, the above described coating composition was coated on the above-described base material having a moire print. The properties, particularly viscosity, of the above-described coating composition before coating and the dispersed state of silicone acrylate were as follows.

| Viscosity: | |
|---|---|
| Temp. (°C.) | cps |
| 25 | 100 |
| 30 | 95 |
| 40 | 70 |
| 50 | 55 |
| 60 | 35 |
| 70 | 25 |

Dispersed State

Suspension with partial dissolution.

The above described coating composition was coated at a coverage of 12 g/m² by gravure direct coating. The line speed was 100 m/min.

The coated product was then irradiated with an electron beam to cure the coating layer. The electron beam irradiation was conducted under the following conditions through the use of a scanning electron beam irradiator.

accelerating voltage: 175 kV
beam current: 183 mA
electron beam: 5 Mrad

The decorative sheet having a moire pattern thus obtained was a sheet of mirror finish having a good gloss on its surface [75° mirror state (JISZ8741): 100]. The obtained decorative sheet was integrally bonded to an MDF plate by means of vinyl acetate adhesive (AC500 manufactured by Chuo Rika Kogyo Corp., Japan) to prepare a decorative plate.

The decorative plate was subjected to tests on the cellophane adhesive tape resistance (tape delamination test), solvent resistance, abrasion resistance and stain resistance. The tests were conducted by the following methods.

Cellophane Adhesive Tape Test

Peeling was conducted by means of a Nichiban tape (40° C.±3° C., after 2 hr) according to the standard for printed plywood-colored plywood (established by Printed and Colored Plywood Association of Japan) to observe the surface appearance.

Solvent Resistance Test

The surface of the decorative sheet was coated with thinner (JISK5538) and rubbed under a load of 500 g to observe the damage to the coating by the solvent according to the above-described standard.

Abrasion Resistance Test

Abrasion test was conducted through the use of two soft abrasion rings under a load of 1 kg according to the standard for JAS Abrasion C Test to observe the state of damage to the coating.

Stain Resistance:

Lines having a size of 10 m/m width were formed on the surface of the coating through the use of an oil base ink, a water base ink and a crayon, allowed to stand for 4 hr and wiped off, and the state of staining was then observed (JAS Stain A Test).

The results of various characteristic tests are given in the following Table 1.

EXAMPLE 2

An electron beam curing coating composition comprising the following components was prepared.

polyester acrylate (manufactured by Morohoshi Ink Co., Ltd.) 60 parts by weight
trimethylolpropane triacrylate (manufactured by Toagosei Chemical Industry Co., Ltd.) 10 parts by weight
1,6-hexanedioldiacrylate (manufactured by Nippon Kayaku Co., Ltd.) 19 parts by weight
silicone acrylate (MEB-1 manufactured by The Shin-Etsu Chemical Co., Ltd.) 1 part by weight
silica powder (manufactured by Catalysts and Chemicals Industries Co., Ltd.) 20 parts by weight Separately, a moire pattern was printed on a reinforced paper (30 g/m²; a product of Sanko Paper Manufacturing Corp.) as a base material by means of a rotogravure printing machine through the use of an acrylic ink (HAT manufactured by Morohoshi Ink Co., Ltd.).

Thereafter, the above-described coating composition was coated on the above-described base material having a moire print. The properties, particularly viscosity, of the above-described coating composition before coating and the dispersed state of silicone acrylate were as follows.

| Viscosity: | |
|---|---|
| Temp. (°C.) | cps |
| 40 | 550 |
| 70 | 165 |

Dispersed State

Suspension with partial dissolution.

The above described coating composition was coated at a coverage of 12 g/m² by gravure direct coating. The line speed was 100 m/min.

The coated product was irradiated with an electron beam to cure the coating layer. The electron beam irradiation was conducted under the following conditions through the use of a scanning electron beam irradiator.

accelerating voltage: 175 kV
beam current: 183 mA
electron beam: 5 Mrad

The decorative sheet having a moire pattern thus obtained was a sheet of mirror finish having a good gloss on its surface [75° mirror state (JISZ8741): 40]. The obtained decorative sheet was integrally bonded to an MDF plate by means of a vinyl acetate adhesive (AC500 manufactured by Chuo Rika Kogyo Corp.) to prepare a decorative plate.

The decorative plate was subjected to tests on the cellophane adhesive tape resistance (tape delamination test), solvent resistance, abrasion resistance and stain resistance. The results are given in the following Table 1.

COMPARATIVE EXAMPLE 1

A decorative plate was prepared in the same manner as that of Example 1, except that use was made of a coating composition comprising the following components and subjected to a test on its characteristics. The results are given in the following Table 1.

acryl polyol 60 parts by weight
modified silicone oil 2 parts by weight
amide wax 1 part by weight tolylene diisocyanate 15 parts by weight
toluene 7 parts by weight
ethyl acetate 15 parts by weight

TABLE 1

|  | Ex. 1 | Ex. 2 | Comp. Ex. 1 |
|---|---|---|---|
| cellophane adhesive tape resistance | free from peeling | free from peeling | free from peeling |
| solvent resistance | not less than 100 times | not less than 100 times | not less than 100 times |
| abrasion resistance | free from loss of pattern | free from loss of pattern | pattern lost |
| stain resistance | no stain | no stain | no stain |
| *) steel woolen property | ○ | ○ | x |

Note: *) ○: good x: poor

What is claimed is:

1. A process for producing a decorative sheet, comprising the steps of:
    coating an ionizing radiation curing coating composition comprising an ionizing radiation-polymerizable oligomer, an ionizing radiation-polymerizable monomer and a releasing agent, said composition having a viscosity regulated to 1000 cps or less, on a base material to form an ionizing radiation curing coating composition layer; and
    irradiating the coating composition layer with an ionizing radiation to cure the coating composition layer.

2. A process according to claim 1, wherein said ionizing radiation is an electron beam and the irradiation is conducted at a dose of 2 to 15 Mrad.

3. A process for producing a decorative sheet having uneven portions formed in synchronism with a pattern, comprising the steps of:
    forming a liquid repellent pattern layer on a base sheet;
    coating said pattern layer with a coating composition comprising an ionizing radiation-polymerizable oligomer, an ionizing radiation-polymerizable monomer and a releasing agent, said composition having a viscosity of no greater than 1000 cps;
    forming a recessed portion in the coating layer formed on the surface of the pattern layer through liquid repellent action between the formed liquid repellent pattern layer and the coating layer; and
    irradiating the coating layer with an ionizing radiation to cure the coating layer having uneven portions in synchronism with the pattern of the pattern layer.

4. A process for producing a decorative sheet having uneven portions formed in synchronism with a pattern, comprising the steps of:
    forming a liquid repellent pattern layer on a base sheet;
    coating said pattern layer with a coating composition comprising an ionizing radiation-polymerizable oligomer, an ionizing radiation-polymerizable monomer and a releasing agent comprising a silicone acrylate having a molecular weight of 1000 to 10000 and a functional group equivalent of no greater than 2000, said composition having a viscosity of no greater than 1000 cps;
    forming a recessed portion in the coating layer formed on the surface of the pattern layer through liquid repellent action between the formed liquid repellent pattern layer and the coating layer; and
    irradiating the coating layer with an ionizing radiation to cure the coating layer having uneven portions in synchronism with the pattern of the pattern layer.

* * * * *